(12) United States Patent
Stokking et al.

(10) Patent No.: US 11,037,321 B2
(45) Date of Patent: Jun. 15, 2021

(54) DETERMINING SIZE OF VIRTUAL OBJECT

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Hans Maarten Stokking, Wateringen (NL); Martin Prins, The Hague (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/462,450

(22) PCT Filed: Dec. 1, 2017

(86) PCT No.: PCT/EP2017/081119
§ 371 (c)(1),
(2) Date: May 20, 2019

(87) PCT Pub. No.: WO2018/100131
PCT Pub. Date: Jun. 7, 2018

(65) Prior Publication Data
US 2019/0378289 A1    Dec. 12, 2019

(30) Foreign Application Priority Data
Dec. 2, 2016 (EP) .................................... 16201955

(51) Int. Cl.
*G06T 7/62* (2017.01)
*G06T 7/593* (2017.01)
(Continued)

(52) U.S. Cl.
CPC ............ *G06T 7/62* (2017.01); *G02B 27/0093* (2013.01); *G02B 27/017* (2013.01); *G06T 7/593* (2017.01);
(Continued)

(58) Field of Classification Search
CPC .......... G06T 7/62; G06T 15/205; G06T 7/70; G06T 7/593; G06T 2207/10028; G02B 27/0093; G02B 27/017
(Continued)

(56) References Cited

U.S. PATENT DOCUMENTS 10,229,656 B2 * 3/2019 Takahashi ................ G09G 5/00
2008/0088627 A1 * 4/2008 Shimizu .................. G06F 16/71
345/427

(Continued)

OTHER PUBLICATIONS

Eisert, et al., "Immersive 3-D Video Conferencing: Challenges, Concepts and Implementations," Proc. SPIE Visual Communications and Image Processing (VCIP), Lugano, Switzerland, Jul. 2003.

(Continued)

*Primary Examiner* — Congvan Tran
(74) *Attorney, Agent, or Firm* — Hamilton, Brook, Smith & Reynolds, P.C.

(57) ABSTRACT

A system and method are provided for determining a size of a virtual object in a virtual environment. The virtual object may represent an object in physical space. The system and method may obtain image data of the object from a camera, obtain camera metadata indicative of an angle of view of the camera, estimate an object distance between the object and the camera, and estimate a physical size of the object in physical space by determining an image size of the object in the image data, and determining a relation between the image size and the physical size of the object on the basis of the camera metadata and the object distance. Accordingly, (Continued)

the size of the virtual object in the virtual environment may be determined in accordance with the physical size of the object. Virtual objects may thus be given realistic relative sizes in the virtual environment. A further advantage may be that there is no need for a calibrated system of multiple cameras and a calibrated rendering environment.

12 Claims, 10 Drawing Sheets

(51) Int. Cl.
  *G06T 7/70* (2017.01)
  *G02B 27/00* (2006.01)
  *G02B 27/01* (2006.01)
  *G06T 15/20* (2011.01)
(52) U.S. Cl.
  CPC ............... *G06T 7/70* (2017.01); *G06T 15/205* (2013.01); *G06T 2207/10028* (2013.01)
(58) Field of Classification Search
  USPC ........................................................ 382/154
  See application file for complete search history.

(56) References Cited

U.S. PATENT DOCUMENTS

2015/0310135 A1* 10/2015 Forsyth ................... G06F 30/13
  703/1
2016/0309239 A1* 10/2016 Maruyama .......... G06F 16/7867
2017/0124385 A1* 5/2017 Ganong ............. G06Q 30/0241
2017/0286993 A1* 10/2017 Khalid ................. G06T 19/006

OTHER PUBLICATIONS

Hirose, et al., "Integrating Live Video for Immersive Environments," IEEE MulitMedia, 1070-986x199, Jul.-Sep. 1999, pp. 14-22. I.

Huang, et al. "A Real-Time Model-Based Human Motion Analysis System," IEEE International Conference on Multimedia and Expo (ICME) 2003, 0-7803-7965-9/03, pp. I-477 through II-480.

Mrovlje, et al., "Distance Measuring Based on Stereoscopic Pictures," 9th International PhD Workshop on Systems and Control: Young Generation Viewpoint, Izola, Slovenia, Oct. 1-3, 2008.

Rajan, et al., "A Realistic Video Avatar System for Networked Virtual Environments," Electronic Visualization Laboratory, University of Illinois at Chicago, Chicago, IL, USA, 10 pages (2002).

International Search Report and the Written Opinion for International Application No. PCT/EP2017/081119, ntitled "Determining Size of Virtual Object," dated Feb. 13, 2018.

Arafat, "How to Measure the Real Size of an Object from an Unknown Picture?" Retrieved from the Internet: URL: How_to_measure_the_real_size_of_an_object_from_an_unknown_picture, XP002770722, Jan. 27, 2015.

European Search Report for EP Application No. 16201955, entitled "Determining Size of Virtual Object," dated Jun. 16, 2017.

Burgos-Artizzu, et al., "Real-time expression-sensitive HMD face reconstruction," Siggraph Asia 2015.

* cited by examiner

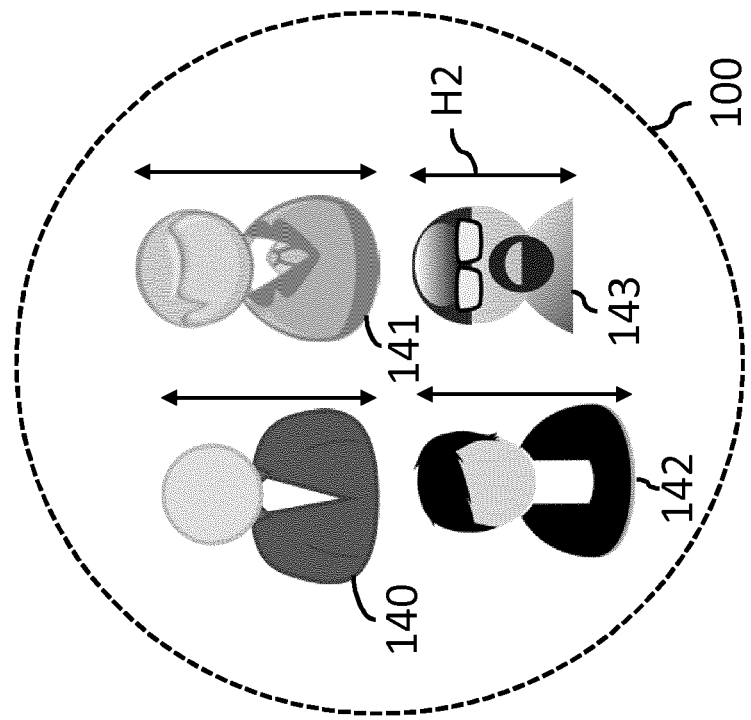
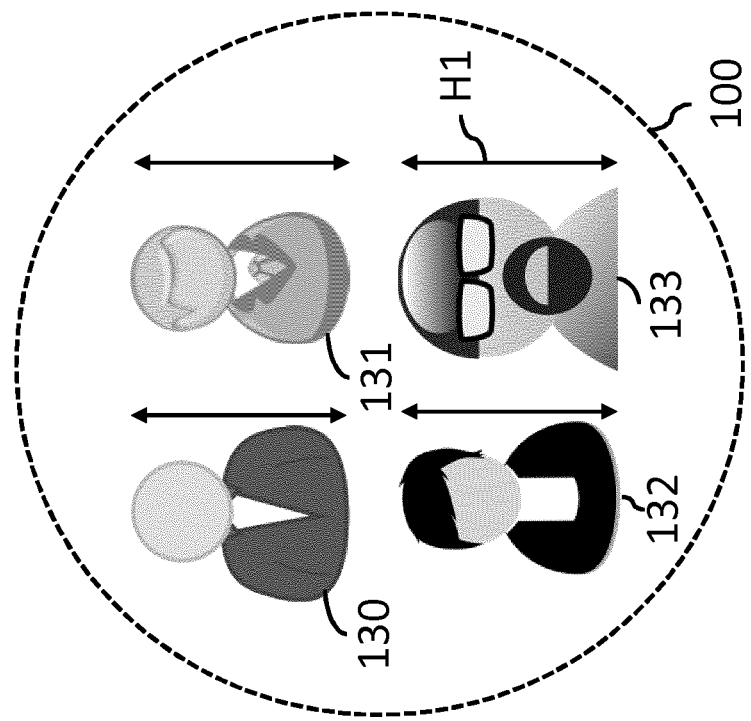

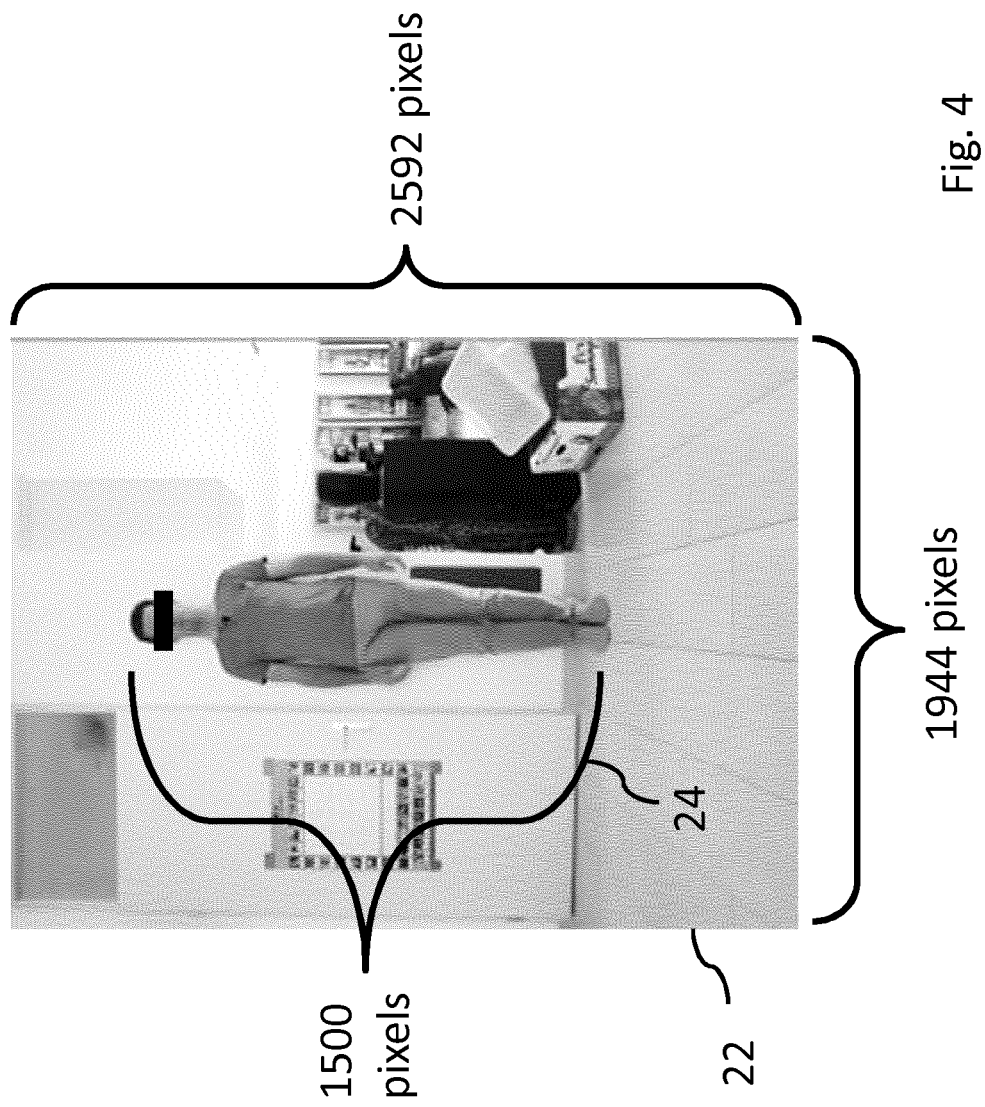

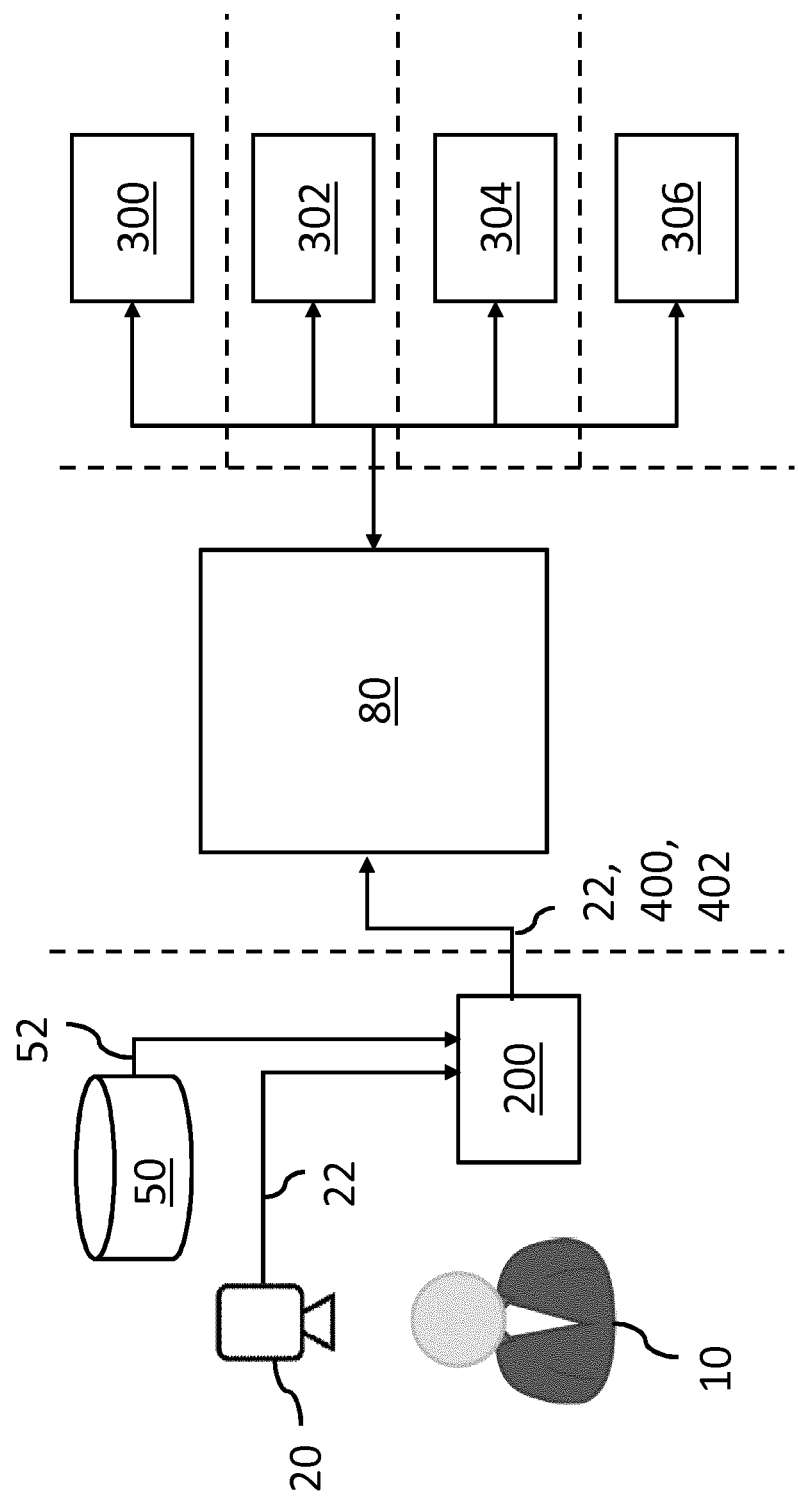

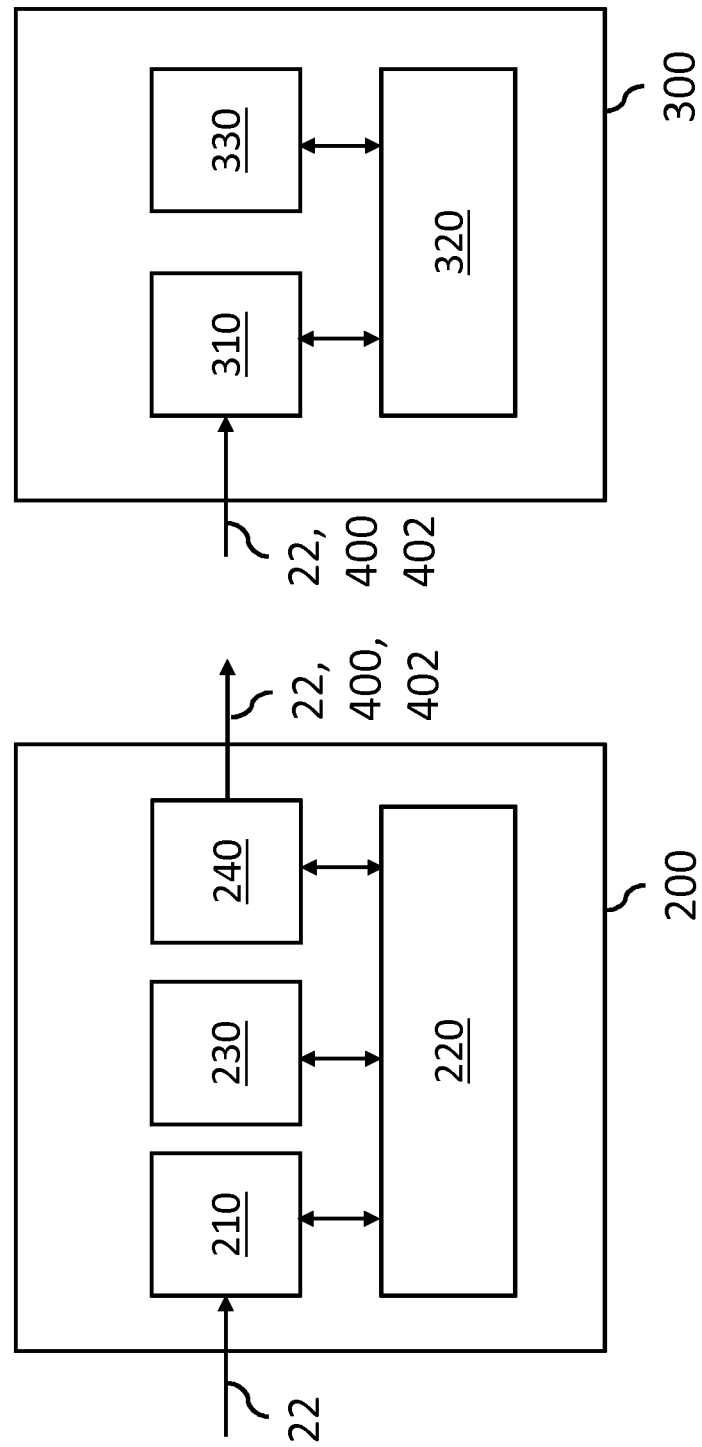

DETERMINING SIZE OF VIRTUAL OBJECT

This application is the U.S. National Stage of International Application No. PCT/EP2017/081119, filed Dec. 1, 2017, which designates the U.S., published in English, and claims priority under 35 U.S.C. § 119 or 365(c) to EP Application No. 16201955.8, filed Dec. 2, 2016. The entire teachings of the above applications are incorporated herein by reference.

FIELD OF THE INVENTION

The invention relates to a method and system for determining a size of a virtual object in a virtual environment. The invention further relates to object size metadata which is indicative of said determined size. The invention further relates to a rendering device and a server which are configured to establish the size of the virtual object in the virtual environment in accordance with the object size metadata.

BACKGROUND ART

Virtual Reality (VR) involves the use of computer technology to give a user a sense of immersion in a virtual environment. Typically, VR rendering devices, also in the following simply referred to as VR devices, make use of Head Mounted Displays (HMD) to render the virtual environment to the user, although other types of VR displays and rendering techniques may be used as well, including but not limited to holography and Cave automatic virtual environments (recursive acronym CAVE).

It is known to use a VR environment, which is in the context of VR also simply referred to as 'virtual environment', for multiuser communication. In such multiuser communication, users may be represented by avatars within the virtual environment, while communicating via voice, e.g., using a microphone and speakers, and/or nonverbal communication. Examples of the latter include, but are not limited to, text-based communication, gesture-based communication, etc. Here, the term 'avatar' refers to a representation of the user within the virtual environment, which may include representations as real or imaginary persons, real or abstract objects, etc.

Such VR environment-based multiuser communication is known per se, e.g., from AltspaceVR (http://altvr.com/), Improov (http://www.middlevr.com/improov/), 3D ICC (http://www.3dicc.com/), etc. It is also known to combine a VR environment with video-based communication. For example, it is known from Improov, which is said to be a 'platform for collaboration in virtual reality', to use a live camera recording of a user as an avatar in the virtual environment. It is also known to render such virtual environments without the use of Virtual Reality, e.g., on a television or monitor.

The inventors have considered that in scenarios in which a user is represented in the virtual environment by a virtual representation of him/herself, it may be needed to establish a size of the virtual representation in the virtual environment. It may be possible to select a standard size. However, this may have disadvantages. For example, if multiple users are represented in the virtual environment by their virtual representations, such a standard size may result in an unnatural representation of the users in the virtual environment. Namely, any differences in physical size between the users would be 'lost' in the virtual environment. This problem may be worse when the virtual representations are realistic rather than abstract representations of the users, e.g., by each virtual representation comprising a visual rendering of image data of the respective users which is recorded live. Namely, given such realistic representations, it may be expected that also their size differences are realistic. For example, if the virtual environment is rendered using a stereoscopic display, such non-realistic standard sizes of the virtual representations may be especially noticeable to users of the virtual environment.

The inventors have also recognized that the above problem also occurs when a physical object other than a person is represented in the virtual environment by a virtual object. The problem is thus not limited to virtual representations of persons.

It is possible for a user to specify his/her size, e.g., his/her height, and establish the size of the avatar in the virtual environment accordingly. Alternatively, such information may be obtained from a user profile. However, in case the virtual representation comprises a visual rendering of image data of the user, the image data may not always show all of the user, i.e., top to toe, nor in a standing position. Rather, the image data may show only part of the user, e.g., his/her face and upper body. In such and similar cases, there may be an unknown relationship between what is exactly shown in the image data and the size indication obtained from the user (profile).

A publication "Integrating live video for immersive environments" by Hirose et al., IEEE Multimedia 6.3, 1999, pp. 14-22, describes making a video avatar of a user. A camera is said to capture an image of the user and extracts the image of the user's figure from the background. This image is transmitted to another site and integrated with the shared virtual 3D world. The rendered image is projected as a video avatar in the immersive projection display. It is said that the extracted user's figure must display in 3D space at its actual size and in the correct position, not just superimposed as a 2D image. To adjust the displayed size, the camera conditions and the relationships among the users' positions in the virtual space are considered. Disadvantageously, Hirose et al. use a calibrated system of multiple cameras and a calibrated rendering environment to ensure that the image of the user is correctly sized when displayed.

SUMMARY OF THE INVENTION

It would be advantageous to obtain a method and system for determining a size of a virtual object in accordance with a physical size of an object, with the method and system addressing at least one of the problems of Hirose et al.

In accordance with a first aspect of the invention, a method is provided for determining a size of a virtual object in a virtual environment. The virtual object may represent an object in physical space. The method may comprise:
obtaining image data of the object from a camera;
obtaining camera metadata indicative of an angle of view of the camera;
estimating an object distance between the object and the camera;
estimating a physical size of the object in physical space by:
  i) determining an image size of the object in the image data, and
  ii) determining a relation between the image size and the physical size of the object on the basis of the camera metadata and the object distance; and
determining the size of the virtual object for rendering in the virtual environment in accordance with the physical size of the object.

In accordance with a further aspect of the invention, a transitory or non-transitory computer-readable medium is provided which may comprise object size metadata associated with image data of an object, wherein the image data may be obtained from a camera, and wherein the object size metadata may comprise camera metadata indicative of an angle of view of the camera and data indicative of an object distance between the object and the camera.

In accordance with a further aspect of the invention, a transitory or non-transitory computer-readable medium is provided which may comprise object size metadata defining a size of a virtual object in a virtual environment, wherein the virtual object may represent an object in physical space, and wherein the size of the virtual object in the virtual environment may be in accordance with a physical size of the object as determined from image data of the object and camera metadata.

In accordance with a further aspect of the invention, a system is provided which may be configured to generate object size metadata associated with a virtual object in a virtual environment. The virtual object may represent an object in physical space. The system may comprise:
a camera interface to a camera for obtaining image data of the object;
a memory comprising instruction data representing a set of instructions;
a processor configured to communicate with the camera interface and the memory and to execute the set of instructions, wherein the set of instructions, when executed by the processor, may cause the processor to:
  obtain camera metadata indicative of an angle of view of the camera;
  estimate an object distance between the object and the camera;
  generate object size metadata on the basis of the camera metadata and the object distance to enable a rendering device or server to establish the size of the virtual object in the virtual environment in accordance with a physical size of the object in physical space on the basis of the object size metadata.

The system may be connected to the camera or comprise the camera, in which case the camera may be internally connected. The system may be integrated in a device, such as but not limited to the camera, smartphone, tablet device, laptop, etc.

In accordance with a further aspect of the invention, a network entity being a server for hosting a virtual environment or a rendering device for rendering the virtual environment are provided. The virtual environment may comprise a virtual object. The virtual object may represent an object in physical space.

The network entity may comprise:
a network interface to a network for receiving:
  image data of the object from a camera;
  object size metadata indicative of a size of a virtual object in the virtual environment;
a memory comprising instruction data representing a set of instructions;
a processor configured to communicate with the network interface and the memory and to execute the set of instructions, wherein the set of instructions, when executed by the processor, may cause the processor to:
  generate the virtual object in the virtual environment to comprise a visual rendering of the image data of the object;
  establish the size of the virtual object in the virtual environment in accordance with the object size metadata.

The above measures relate to rendering of a virtual object in a virtual environment, with the virtual object representing an object in physical space. By way of example, the object is in the following a person, henceforth also referred to as 'user'. However, this is not a limitation, in that the object may also be nonhuman.

In accordance with the above measures, image data of the user may be obtained from a camera, such as a webcam of a laptop or a camera of a smartphone or tablet device. For example, the image data may be obtained to establish an image- or video-based avatar of the user in the virtual environment. In the latter case, the image data may be a part of video data, with the image data representing, e.g., a full video frame or a cropping thereof. In addition to the image data, camera metadata may be obtained which is associated with the camera and which may be indicative of an angle of view of the camera, in that it allows the angle of view of the camera to be determined. In a specific example, the camera metadata may directly specify the angle of view of the camera. In another specific example, the camera metadata may specify the focal length and the sensor size of the camera. In yet another specific example, the camera metadata may specify the equivalent focal length at a reference sensor size.

The above measures further involve estimating the distance between the object and the camera in the situation to which the image data pertains. Having obtained the camera metadata and the object distance, a physical size of the object in physical space may be estimated by determining an image size of the object in the image data, e.g., as measured in pixels or any other image-related quantity. As such, it may be determined how large the object is relative to the image's overall dimensions. For that purpose, known image segmentation techniques may be used to segment the object in the image, which then allows determining the object's image size. For example, it may be determined that the object has a height of 50% of the image height. A relation between the image size and the physical size of the object may then be determined using the angle of view of the camera and the object distance. For that purpose, mathematical expressions which are known per se may be used.

Having determined the physical size of the object, the virtual object in the virtual environment may be established in accordance with the physical size. For example, the 'virtual size', referring to the size of the object in the virtual environment, may be selected proportional to the physical size. For example, a linear relation may be used so that a twice as large physical size results in a twice as large virtual size. It will be appreciated that many other types of relations may be used as well. The above may be performed by a single system or device. Alternatively, the camera metadata and the object distance may be determined by a first entity and provided in the form of object size metadata to a second entity, e.g., via a network, to enable the second entity to carry out the above described determinations. Examples of the first entity include, but are not limited to, a recording device which comprises or is connected to the camera. Examples of the second entity include but are not limited to a server for hosting the virtual environment or a rendering device for rendering the virtual environment.

The above measures have the effect that the size of the virtual object in the virtual environment may be determined in accordance with the physical size of the object in a relatively simple manner. Namely, it may suffice to obtain the camera metadata, the object distance and the image data of an otherwise 'arbitrary' camera to determine the physical size of the object. It is thus not needed to use a calibrated set-up, e.g., involving cameras which are positioned at known positions. An advantage of the above measures is that it allows establishing the virtual size of the virtual object in accordance with the physical size of the object even in situations which are relatively uncontrolled or uncontrollable, e.g., a user participating in a virtual environment using a smartphone or tablet device, or when using an 'arbitrarily' positioned webcam. It is thus not needed to use a calibrated system of multiple cameras with known relationships. An additional advantage is that the information from which the physical size is determinable may be easily transmitted in the form of object size metadata, e.g., via a network from a first entity to a second entity. The above measures may thus be carried out together by several (network-)connected entities rather than by a single entity. A further advantage may be that any VR rendering environment may render the object at its appropriate size, e.g., the rendering environment does need not reflect or be calibrated in any way specifically taking into account the used capture environment.

In an embodiment, the virtual object in the virtual environment may comprise a visual rendering of the image data of the object. For example, the virtual object may be an image- or video-based avatar. An example of the latter is known from Hirose et al., and may also be simply referred to as 'video avatar'. Alternatively, the virtual object may be a graphical avatar of which the virtual size is based on the determined physical size of the object. The graphical avatar may be a photorealistic avatar generated based on the image data. The graphical avatar may be animated in correspondence with movements of the object as may be determined from video data of the object, e.g., using character animation techniques known per se.

In an embodiment, the obtaining the camera metadata may comprise obtaining EXIF metadata, MPEG metadata or ONVIF metadata included in or associated with the image data. Here, EXIF refers to 'Exchangeable Image File Format', MPEG refers to 'Moving Picture Experts Group' and ONVIF refers to 'Open Network Video Interface Forum'. Such types of metadata may be indicative of an angle of view of a camera. For example, there exist EXIF tags such as, but not limited to, Exif.Photo.FocalLengthIn35mmFilm' which allow calculation of the angle of view. The use of various other types and combinations of metadata is equally conceivable.

In an embodiment, the obtaining the camera metadata may comprise:
  accessing a database comprising camera metadata of different camera types;
  obtaining a type identifier of the camera; and
  retrieving at least part of the camera metadata on the basis of looking up the type identifier of the camera in the database.

The camera metadata may be, at least in part, retrieved from a database. This may particularly apply to the part of the camera metadata which relates to fixed or static parameters. For example, if use is made of camera metadata in the form of the focal length of the camera and the sensor size, the latter is typically a fixed parameter and thus may be stored and subsequently retrieved from a database. For that purpose, a type identifier of the camera may be obtained, and a database may be accessed which comprises the camera metadata of different types of cameras. It is noted that the viewing angle and/or the focal length may also be fixed parameters, e.g., by the camera having a fixed focal length or by being configured to record with a fixed focal length. An advantage of this embodiment may be that it not needed to obtain the camera metadata directly from the camera, which may not always be possible. Rather, it may suffice to obtain a type identifier of the camera. Yet another advantage of this embodiment may be that incomplete camera metadata from the camera may be supplemented by supplementary camera metadata stored in a database.

To fill the database, users may manually enter camera metadata into the database. Additionally or alternatively, the database may be pre-filled with camera metadata, e.g., by a manufacture of a camera or a service provider, etc.

In an embodiment, the determining the object distance may comprise obtaining auxiliary data from the camera or a further device, e.g., a further camera or a microphone, which auxiliary data is indicative of the object distance, and estimating the object distance between the object and the camera may comprise analyzing the auxiliary data. In order to determine the object distance, auxiliary data may be used instead of, or in addition to, the image data. The auxiliary data may be obtained by an auxiliary sensor, which may be a different type of sensor than the camera sensor. Various types of auxiliary sensors and corresponding auxiliary data are known to exist which allow determining a distance to an object. An advantage of this embodiment is that the object distance may be more accurately determined compared to, e.g., an analysis of only the image data, simply assuming a fixed distance, etc.

For example, the auxiliary data may comprise camera metadata indicative of a focal distance of the camera. The focal distance may be indicative of the object distance. For example, the camera may be focused on the object using auto-focus, or the object may be deliberately positioned at the focal distance of the camera. As such, if the object is in focus, the focal distance may correspond to the object distance.

Additionally or alternatively, the auxiliary data may comprise depth data obtained from a depth sensor connected to or comprised in the camera. Depth sensors are known per se, and include depth sensors based on measuring time-of-flight (e.g., using infrared light), light detection and ranging (LiDAR), laser detection and ranging (LaDAR), etc. Such depth sensors may provide a depth map indicative of the distance of objects to the depth sensor. The depth sensor may be physically connected to the camera, e.g., contained in a same housing. The depth sensor may also be electrically connected to the camera, e.g., to enable the camera to jointly output the image data and depth data.

Additionally or alternatively, the auxiliary data may comprise further image data obtained from a further camera, wherein the image data and the further image data may together represent stereoscopic image data of the object, and wherein estimating the object distance between the object and the camera may comprise analysing the stereoscopic image data. The camera and further camera may together provide stereoscopic image data which allows determining an object's distance to the cameras, e.g., using disparity or depth estimation techniques known per se. In a specific example, both cameras may be physically and electronically integrated, in which case they may be jointly referred to as a 'stereo camera'. It will be appreciated that both cameras may also be separately housed yet function as a stereo camera. It is noted that a camera array of more than two cameras may likewise be used. Single cameras capable of capturing more image data than regular monoscopic cameras, such as light field cameras, may likewise be used.

Additionally or alternatively, the auxiliary data may comprise directional audio data obtained from a microphone array connected to or comprised in the camera. The object distance may also be determined from an audio recording of a microphone array, e.g., using sound localization techniques known per se. Here, the term 'microphone array' refers to an arrangement of two or more microphones. In case of two microphones, such a microphone array may also simply be referred to as 'stereo microphone'. Typically, a microphone connected to or comprised in a camera, is located close to the camera sensor and may thus be used to determine the distance of an object based on audio if the object is generating sound, e.g., a person speaking.

In an embodiment, the virtual environment may be a networked virtual environment, the camera may be connected to a system which is connected to a network, and the method may further comprise:

providing the image data from the system via the network to a network entity participating in the networked virtual environment, the network entity being a server hosting the virtual environment or a rendering device; and providing object size metadata from the system to the network entity to enable the network entity to establish the size of the virtual object in the virtual environment in accordance with a physical size of the object in physical space on the basis of the object size metadata.

Networked virtual environments typically involve multiple users which are located at different locations and which communicate with each other using the virtual environment. To access the virtual environment, a user may use a system which is connected to the camera or which comprises the camera (in this case, the camera may be internally connected). The system may be integrated in a device, such as but not limited to a camera, smartphone, tablet device, laptop, etc. If the device also renders the virtual environment to the user, e.g., on a display which is integrated in or connected to the device, the device may also be referred to as 'rendering device'. Alternatively, the system may be comprised of several devices which cooperate. The system may provide the image data to another network entity which participates in the virtual environment, which may be a server hosting the virtual environment or a rendering device. By additionally providing object size metadata to the other network entity, the other network entity is enabled to determine the physical size of the object shown in the image data and establish the virtual size of the virtual object accordingly.

In an embodiment, the method may be performed by the system, and the providing the object size metadata may comprise providing, as the object size metadata, the size of the virtual object in the virtual environment as determined by the system. In this embodiment, the system itself may determine the size of the virtual object and signal the determined size to the other network entity in the form of the object size metadata. As such, the object size metadata may comprise a direct size measure. It is thus not needed for the other network entity to calculate the physical size and then determine the virtual size. Rather, the virtual size is directly indicated to the network entity.

In an embodiment, the providing the object size metadata may comprise providing the camera metadata and the object distance to the network entity to enable the network entity to:

estimate the physical size of the object in physical space on the basis of the camera metadata and the object distance; and determine the size of the virtual object in the virtual environment in accordance with the physical size of the object.

In this embodiment, the system may signal the camera metadata and the object distance to the other network entity to allow the network entity to estimate the physical size of the object based on the received camera metadata and the object distance. The object size metadata thus does not comprise a direct size measure, but rather the metadata required for the other network entity to determine the size.

It will be appreciated by those skilled in the art that two or more of the above-mentioned embodiments, implementations, and/or aspects of the invention may be combined in any way deemed useful.

Modifications and variations of the system, the device comprising the system, the rendering device, the server and/or the computer program, which correspond to the described modifications and variations of the method, may be carried out by a person skilled in the art on the basis of the present description, and vice versa.

BRIEF DESCRIPTION OF THE DRAWINGS

These and other aspects of the invention are apparent from and will be elucidated with reference to the embodiments described hereinafter. In the drawings, FIG. 1 provides a schematic overview of an embodiment for determining of a size of a virtual object in a virtual environment in accordance with its physical size;

FIG. 3A shows a virtual environment in which the avatar of each user, being a selective rendering of the image data of the user, is sized to a same size;

FIG. 3B shows a virtual environment in which the avatar of each user is sized in accordance with a physical size of the user;

FIG. 4 shows an example of image data of a user in which the image size of the user is indicated, as may be determined by segmentation;

FIG. 7 shows a system for determining of a size of a virtual object in a virtual environment in accordance with its physical size, with the system providing image data and object size metadata to a server hosting the virtual environment;

FIG. 8 shows a detailed view of the system of FIG. 7;

FIG. 9 shows a detailed view of a network entity receiving the object size metadata, being the server or a rendering device for rendering the virtual environment;

Figure 1:
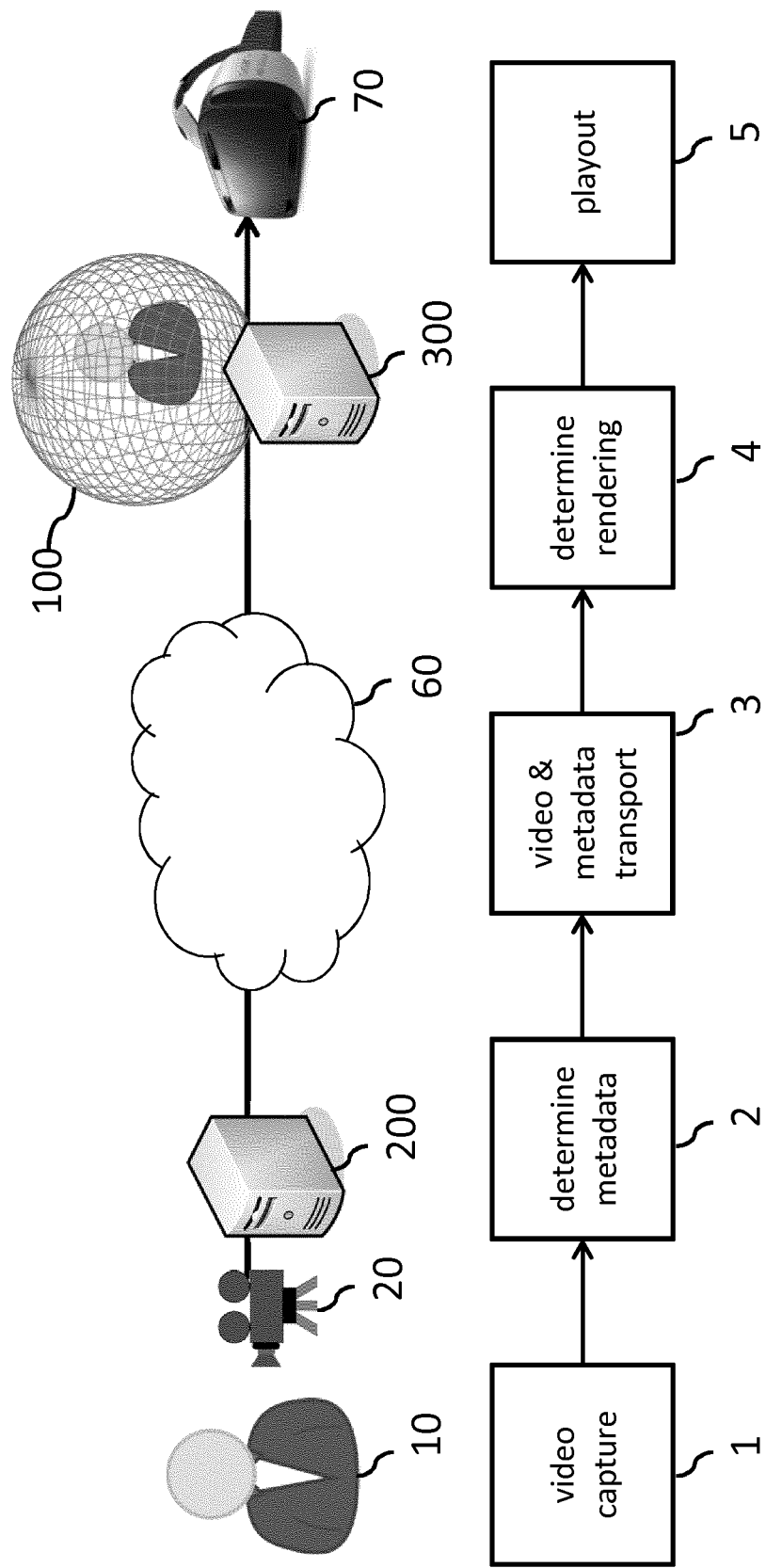

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

1 video capture
2 determine metadata
3 video & metadata transport
4 determine rendering
5 playout
10 object (user)
20 camera
22 image data
24 image height of object
30 further camera
32 further image data
34 stereoscopic image data
40 microphone array
42 directional audio data
50 database
52 database communication
60 network
70 head mounted display
80 server
100 virtual environment
110-113 video avatars in form of rendered image
120-123 video avatars in form of rendered segmented object
130-133 video avatars sized to equal size
140-143 video avatars sized in accordance with physical size
200 system for generating object size metadata
210 camera interface
220 processor
230 memory
240 network interface
300-306 rendering device
310 network interface
320 processor
330 memory
400, 402 object size metadata
410 camera metadata
420 data defining object distance
500 method for determining size of virtual object
510 obtaining image data of object
520 obtaining camera metadata
530 estimating object distance
540 estimating physical size of object
550 determining size of virtual object
600 computer readable medium
610 data stored on computer readable medium
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

FIG. 1 schematically illustrates how a size of a virtual object in a virtual environment may be established in accordance with its actual physical size. In this example, an object is shown in the form of a user 10 whom may be recorded by a camera 20. The video data of the camera 20 may be transmitted by a system 200 via a network 60 to a network entity such as a rendering device 300 or a server, with FIG. 1 showing the former. The rendering device 300 may render a virtual environment 100 which may comprise a visual rendering of the video data of the user 10, with the rendered virtual environment being displayed by a head mounted display 70. Here, the term 'rendering' may refer to the process of generating an image or a video from a geometric description of the virtual environment, but may also include alternative rendering means, including but not limited to the rendering of volumetric video content representing the virtual environment. It is further noted that the visual rendering of the video data of the user 10 in the virtual environment is a virtual representation of the user 10 which is an example of a virtual object representing a physical object.

To enable the size of the virtual object in the virtual environment to be determined in accordance with its physical size, after the video is captured in a first step 1 titled 'video capture', object size metadata may be determined in a second step 2 titled 'determine metadata'. The video data may, in a third step 3 titled 'video & metadata transport', be transported via the network 60 to the rendering device 300 together with the object size metadata. During a fourth step 4 titled 'determine rendering', the virtual environment 100 may be rendered and the size of the virtual object in the virtual environment 100 may be established in accordance with the physical size of the object. The rendered virtual environment may, in fifth step 5 titled 'playout', then be displayed or played-out on the head mounted display 70.

It is noted that the virtual environment 100 may be shown in FIG. 1 and following figures as a circular shape, e.g., a ball or a circle, but may appear to the viewer of the virtual environment 100 to have any other size and/or shape.

Moreover, although FIG. 1 refers to the recording and transmittal of video data, e.g., the image data of several images, alternatively also the image data of a single still image may be recorded and transmitted. Any reference to 'image data' may thus be understood as including a video frame as well as a single still image.

The virtual object in the virtual environment 100 may be an avatar which is generated based on the image data. Such an avatar may take any suitable shape and/or form, including but not limited to a video-avatar or a photorealistic representation of the user 10 which is generated based on image data. The photorealistic representation may be static, or may be animated in correspondence with movements of the user recorded by the camera 20, e.g., using known 'character animation' techniques. Alternatively, a non-photorealistic representation of the user may be animated by way of such character animation. The video-avatar may represent a rendering of a part of the image data which specifically shows the user. For that purpose, the user may be segmented in the image data, either by the system before transmission of by the network entity after receipt. This may comprise cropping the image data before transmission. The video-avatar may also show the surroundings of the user. For example, the video avatar may represent a virtual display which simply displays the received image data in the virtual environment 100. In this example, there may be no need to segment the user in the image data.

Figure 2B:
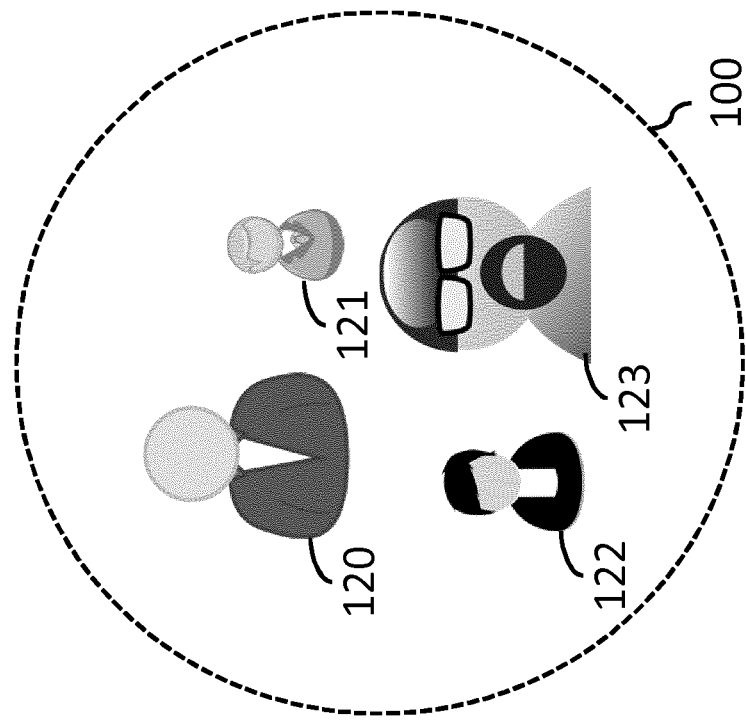
FIG. 2B shows a virtual environment in which the avatar of each user comprises a selective rendering of the image data belonging to the respective user.
Figure 2A:
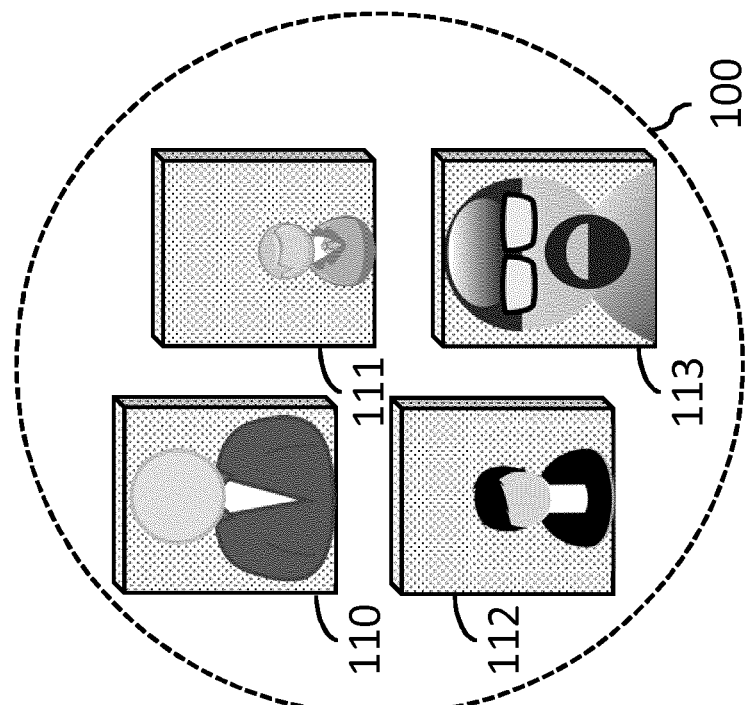
FIG. 2A shows a virtual environment in which the avatar of each user comprises a rendering of the image data of the respective user including surroundings.

FIG. 2A shows an example of a rendering of the virtual environment 100. In this example, the virtual environment 100 is shown to comprise four avatars 110-113 of respective users, with the avatars being 'display-type' of avatars which resemble a virtual display that simply displays the received image data of each user. It is noted that such 'display-type' avatars typically also show parts of the surroundings of the user, e.g., a background scene. FIG. 2B shows an alternative rendering, in that the virtual environment 100 is shown to comprise four avatars 120-123 which each represent a selective rendering of the image data belonging to the respective user. Such selective rendering may be obtained by segmentation techniques which allow distinguishing between image data of the user and image data of his/her surroundings. Such segmentation techniques are known per se from the field of image analysis, and are often called background removal or foreground extraction techniques.

It can be seen in FIG. 2A that the users may have a different size in each of the 'virtual displays'. This may be caused by their physical difference in size, but also by various auxiliary factors, including but not limited to the user's distance to the camera, the angle of view of the camera, etc. It will be appreciated that in FIG. 2A, the differences in size in each of the 'virtual displays' may be predominately due to such auxiliary factors rather than actual differences in physical size. The situation in FIG. 2A may thus be perceived as unnatural. This may be further exaggerated in the situation of FIG. 2B where the user's surroundings are removed. By doing so, it may be harder to distinguish whether the size differences between the avatars 120-123 are due to actual differences in physical size between the users or due to auxiliary factors.

FIG. 3A shows a virtual environment 100 in which the avatar 130-133 of each user, being a selective rendering of the image data of the respective user, is sized to a same size, e.g., a standard size as indicated in FIG. 3A by the vertical double-arrowed line H1. Disadvantageously, any differences in physical size between the users are 'lost' in the virtual environment 100 of FIG. 3A. In particular, avatar 133 may appear unnaturally large since the image data showed the user from nearby.

FIG. 3B shows a virtual environment 100 in which the avatar of each user is sized in accordance with a physical size of the user, e.g., as a result of the measures shown in FIG. 1. It can be seen that the avatars 140-143 have different sizes which may represent their difference in physical size. As a result, the avatar 143 has a smaller size than avatar 133 of FIG. 3A, as indicated by the vertical double-arrowed line H2.

It will be appreciated that, in general, there may be a linear relation between physical size and virtual size, e.g., a simply linear scaling of the physical quantity to a virtual quantity. Such scaling may take place by the rendering engine, e.g., of a rendering device, or beforehand. Also, any other suitable mapping function may be chosen, e.g., one that preserves the order of sizes but not their exact proportions. The rendering engine or another entity rendering the virtual environment may also directly accept the physical size as input, rather than using other units to represent the size of objects in the virtual environment. In this case, the physical size as determined from the image data may directly define the size of the virtual object in the virtual environment.

To determine the virtual size in accordance with the physical size, camera metadata may be obtained which is indicative of an angle of view of the camera, e.g., a horizontal, diagonal and/or vertical angle of view. Such camera metadata may be obtained directly from the camera, e.g., from EXIF, ONVIF, or MPEG metadata, but also from other sources, e.g., a database, as described with reference to FIG. 7. In addition to obtaining the camera metadata, an object distance between the object and the camera may be determined, as described with reference to FIGS. 5A-5C. Object size metadata may then be generated which enables establishing the size of the virtual object in the virtual environment in accordance with a physical size of the object in physical space. This may involve calculations as described with reference to FIG. 4. The object size metadata may take various forms, as described with reference to FIGS. 6A and 6B. The object size metadata may be locally used but also by another (network) entity. Different scenarios are explained with reference to FIGS. 7-9.

FIG. 4 shows an example of image data 22 of a user which may be captured by a camera. Here, the image data is shown to have spatial dimensions of 1944 by 2592 pixels. In addition, the image height 24 of the user is indicated, e.g., 1500 pixels, as may be determined by the earlier described segmentation. Moreover, in this example, it may be determined from camera metadata that the focal length at 35 mm is 22 mm. For example, this equivalent focal length may be indicated in EXIF metadata in the form of a 'Exif.Photo.FocalLengthIn35mmFilm' tag. It is noted that a 35 mm sensor has a 36 mm width and a 24 mm height. Such type of camera metadata allows the angle of view to be determined, e.g., using the formula viewing angle=2*arc tan(sensor size/(2*focal length)). It will be appreciated that any two parameters in said formula allow determining the third parameter. It is noted that if the sensor size is specified in a certain direction, e.g., vertically, horizontally or diagonally, the formula yields the viewing angle in that direction. For example, in case the focal length is 22 m and the sensor height is 36 mm, the vertical viewing angle may be determined to be 2*arc tan(36/(2*22))=2*arc tan(0.8182)=approximately 78.6 degrees.

It may also be determined that the distance to the user is 2.06 m, as will be further discussed with reference to FIGS. 5A-5C. A physical size of the user, or in general the object, may then be determined as follows:

$$\text{physical object height} = \frac{\text{object distant} * \text{image object height} * \text{sensor height}}{\text{focal length} * \text{image height}}$$

which, when the parameters are substituted by the data obtained from the camera metadata, the object distance and the image height of the user, yields:

$$\text{physical user height} = \frac{2.06 \text{ m} * 1500 \text{ pixels} * 36 \text{ mm}}{22 \text{ mm} * 2592 \text{ pixels}} = 1.95 \text{ m}$$

The above may be based on the camera given its angle of view covering at the object distance a maximum height of 2*object distance*tan(viewing angle/2), which in the present examples yields a maximum height of 2*2.06 m*tan (78.6/2)=3.37 m. An object being positioned at 2.06 m from the camera sensor and filling the entire angle of view of the camera sensor in vertical direction would thus have a physical height of 3.37 m. However, the object may not fill the entire angle of view of the camera sensor in vertical direction. As such, in the image data, the object's vertical image size ('image object height') may be less than the overall vertical image size ('Image height'). Accordingly, the object's physical height may be calculated as a fraction of the maximum height of 3.37 m, the fraction being image object height/image height. In this example, the physical object height may thus be equal to 3.37 m*(1500 pixels/ 2595 pixels)=1.95 m. Both expressions may be combined to yield:

$$\text{physical object height} = \frac{2*\text{object distant}*\tan\left(\frac{\text{viewing angle}}{2}\right)*\text{image object height}}{\text{image height}}$$

It is noted that in the above, the height of the object (user) is determined. Additionally or alternatively, the width of the object may be determined, or in general any dimension of the object in an object plane parallel to the sensor plane. For objects not parallel to the sensor plane, the physical size may also be determined from image data, assuming the final rendering is viewed from the same perspective as the camera perspective, or possibly after image transformations are applied.

It will be appreciated that the calculations for estimating the physical size of an object may be affected by various factors. In a default scenario, the sensor size and focal length as determined from the camera metadata may be directly used in the calculations, or alternatively, the camera metadata may directly indicate the angle of view, This may be sufficient in many scenarios, e.g., for images made with a camera with a standard lens of an object at some distance from the camera. However, in certain circumstances, other factors may influence the calculations. This may be the case when a lens with a certain distortion is used (such as a fish-eye lens), or in case the object is very close to the camera, e.g., in macro shots. In macro shots, the lens-to-object distance is comparable to the focal length, and in this case the magnification factor may need to be taken into account. Other circumstances that influence the calculations may be, e.g. breathing (e.g., slight change of angle of view when changing focus), lens asymmetry and when images are cropped on the camera's sensor.

Calculations that take such factors into account are known in the art. This may generally involve calculating an effective focal length which is an adjustment of the stated focal length. For example, for macro shots, a multiplication factor may be taken into account, e.g., $f=F*(1+m)$ wherein f is the effective focal length, F is the stated focal length and m is the multiplication factor. For lens asymmetry, the ratio P between apparent exit and entrance pupil diameter may be taken into account, e.g., $f=F*(1+m/P)$. For breathing effects, the distance between lens and image plane may be taken into account, e.g., $S2=(S1*f)/(S1-f)$, wherein S2 is the actual distance between lens and image plane (sensor) and S1 is the distance to the object.

To determine the object distance, various options are possible. FIG. 5A illustrates the capture of image data 22 of a user 10 by a camera 20. Additionally, auxiliary data may be obtained which is indicative of the object distance, in which case the object distance may be determined at least partly from the auxiliary data.

Figure 5C:
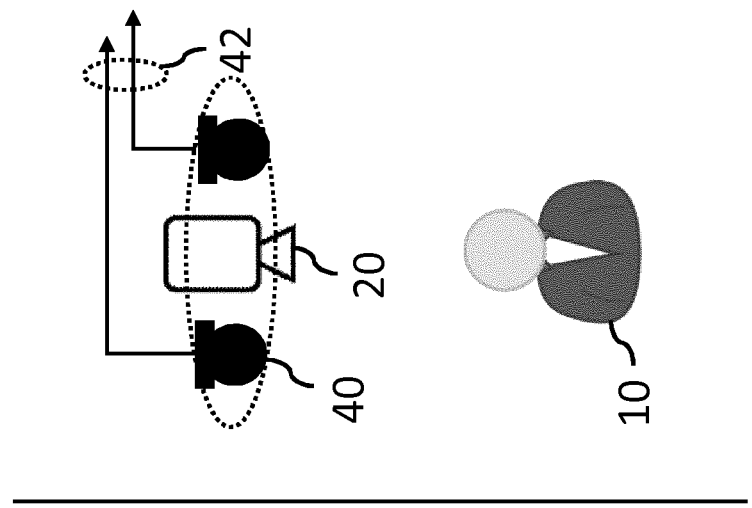
FIG. 5C illustrates the capture of directional audio data by a microphone array, with the microphone array being connected to the camera.
Figure 5B:
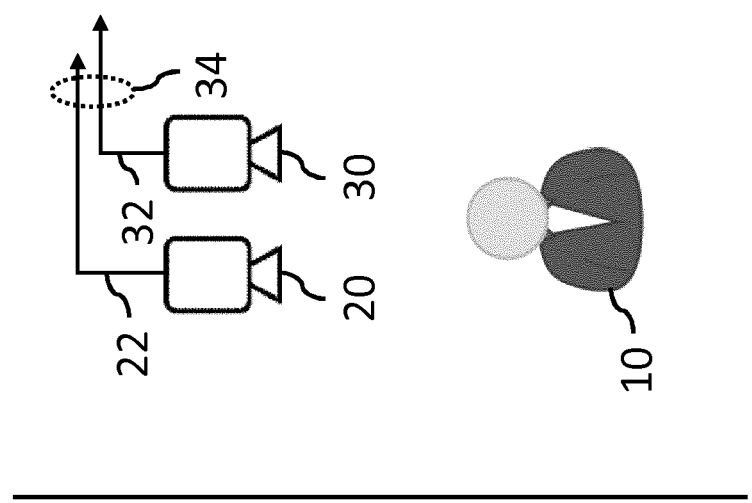
FIG. 5B illustrates the capture of stereoscopic image data by a combination of two cameras, e.g., the first mentioned camera and a further camera.
Figure 5A:
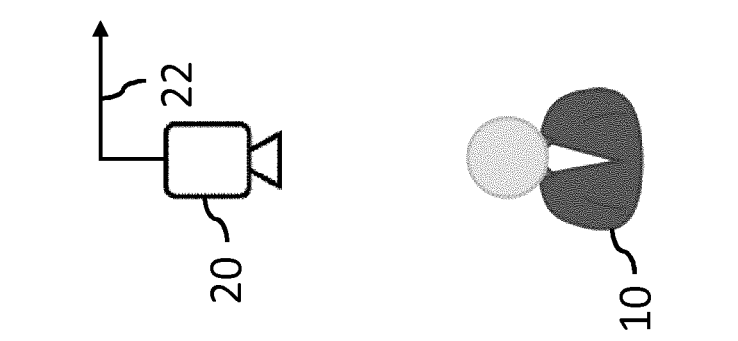
FIG. 5A illustrates the capture of image data of a user by a camera.

FIGS. 5B and 5C show two types of such auxiliary data. In the example of FIG. 5B, further image data 32 is obtained from a further camera 30. The image data 22 and the further image data 32 may together represent stereoscopic image data 34 of the user 10. By analyzing such stereoscopic image data 34, e.g., using disparity or depth estimation techniques known per se, the object distance may be determined. It will be appreciated that although FIG. 5B shows the camera 20 and the further camera 30 to be separate devices, both cameras may also be physically and/or electronically integrated, in which case they may be jointly referred to as a 'stereo camera'. It is noted that a camera array of more than two cameras may likewise be used.

FIG. 5C illustrates the capture of directional audio data 42 by a microphone array 40, with the directional audio data 42 being another example of the aforementioned auxiliary data. In case the object is generating sound, the object distance may be determined from the direction audio data using sound localization techniques known per se. FIG. 5C shows two microphones, e.g., a stereo microphone. However, in general, any microphone array 40 of two or more microphones may be used. In a specific embodiment, three or more microphones may be used. It is noted that the microphone array may be connected to or comprised in the camera 20.

Other examples of auxiliary data include, but are not limited to depth data obtained from a depth sensor connected to or comprised in the camera and camera metadata indicative of a focal distance of the camera. The latter may presume that the object is in focus in the image data. The auxiliary data may also be light field data obtained from a light field camera. Several of the above types of auxiliary data may also be combined. In addition, various other ways of estimating the object distance are equally conceivable. For example, there exist computer vision techniques which may allow estimating depth from mono video. As such, the object distance may in some embodiments be estimated from the image data of a single camera.

It will be appreciated that, although the object distance is described to be a distance between camera and object, the object distance may in fact be a distance which is estimated with respect to the camera's sensor, or which approximates said distance. As such, any reference to 'object distance' is to be understood as including both the distance to the camera's sensor, as well as any distance which approximates said distance. An example of the former is the estimation of the object distance using auto-focus or a stereo camera. An example of the latter is the estimation of the object distance using a depth sensor which is positioned adjacent to the camera's image sensor, or a microphone array connected to or included in the camera. The latter category of measurements may yield a less accurate distance measurement since the depth sensor or microphone array may be place somewhat closer or further from the object compared to the camera sensor. In general, these will result in small errors that are typically negligible for the purposes described in this specification, as the distance to the object is typically much larger than the distance between the 'measurement sensor', e.g., the depth sensor or the microphone array, and the camera sensor.

Figures 6A, 6B:
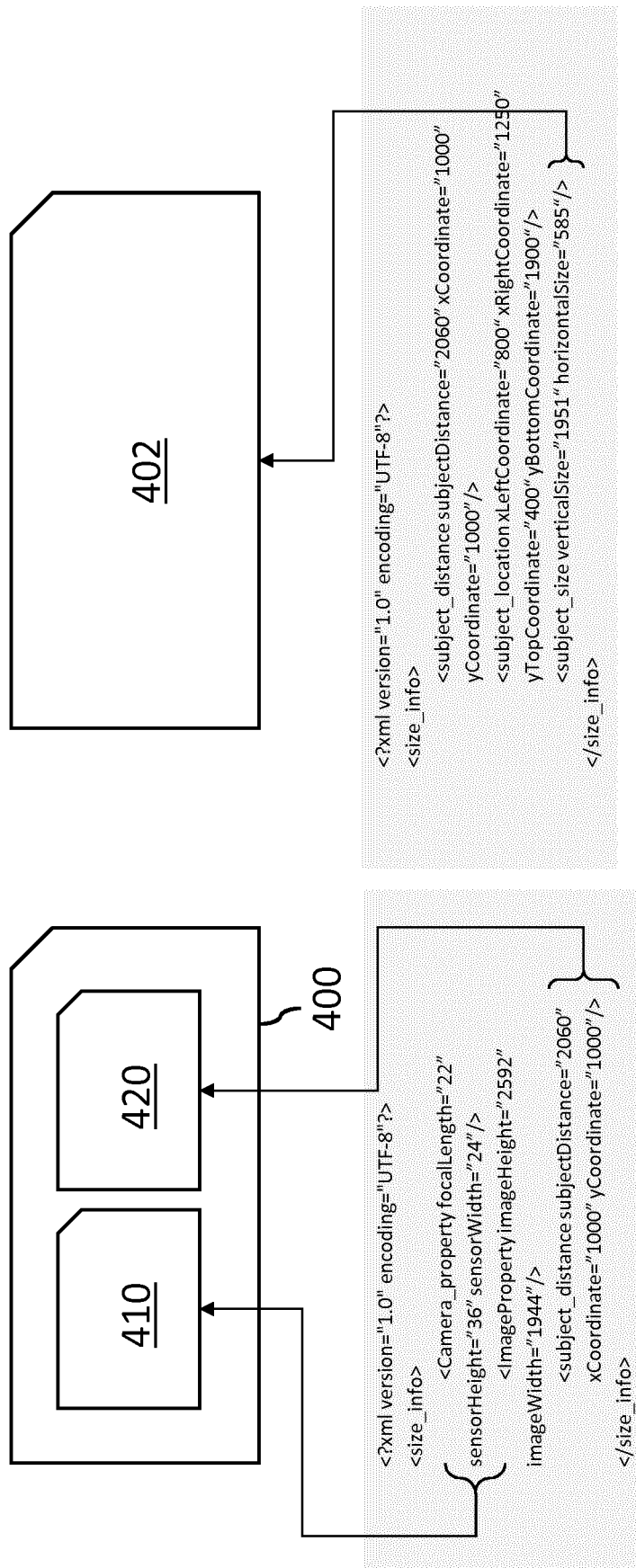
FIG. 6A shows an example of object size metadata which comprises camera metadata and data defining a distance between the object and the camera.
FIG. 6B shows another example of object size metadata which directly defines a size of the virtual object in the virtual environment, with the virtual size having been determined in accordance with a physical size of the object.

With further reference to the object size metadata which may be generated after having obtained the camera metadata and having estimated the object distance, FIG. 6A shows an example of object size metadata 400 which comprises the camera metadata 410 and data 420 defining the distance between the object and the camera. According to this example, the object size metadata may comprise:

```
<?xml version="1.0" encoding="UTF-8"?>
<size_info>
    <Camera_property focalLength="22" sensorHeight="36"
    sensorWidth="24"/>
    <ImageProperty imageHeight="2592" imageWidth="1944"/>
    <subject_distance subjectDistance="2060" xCoordinate="1000"
yCoordinate="1000"/>
</size_info>
```

Here, all distances are in mm and image coordinates and height and width are in pixels. It can be seen that the object size metadata may comprise camera metadata in the form of a focal length, e.g., 22 mm, and a sensor size, e.g., 36 mm by 24 mm. Additionally, the distance to the object, being here a subject such as a user, may be indicated in the form of a 'subject distance', e.g., 2060 mm or 2.06 m. In addition, an image location of the subject may be given in (x,y) image coordinates, which may be determined by known segmentation techniques.

FIG. 6B shows another example of object size metadata 402 which may more directly represent a size of the virtual object in the virtual environment. According to this example, the object size metadata may be the following:

```
<?xml version="1.0" encoding="UTF-8"?>
<size_info>
    <subject_distance subjectDistance="2060" xCoordinate="1000"
yCoordinate="1000"/>
    <subject_location xLeftCoordinate="800" xRightCoordinate="1250"
yTop Coordinate="400" yBottom Coordinate="1900"/>
    <subject_size verticalSize="1951" horizontalSize="585"/>
</size_info>
```

It can be seen that the subject's height is indicated, e.g., 1951 mm or 1.951 m, which may be used directly as virtual size, e.g., if the rendering engine accepts physical sizes as input. For example, in the 'A-Frame' web framework for building VR experiences, as described on https://aframe.io, the object's physical size may be specified including coordinates at which it is to be placed. The rendering by A-Frame may then render the object at the correct size. An example may be:

```
<a-scene>
<a-assets>
    <video id="object-video" autoplay loop="true" src="
    object-video.mp4">
</a-assets>
    <a-video src="# object-video" width="1" height="2"position="0
    0 5"></a-video>
</a-scene>
```

This may render the video with a width of 1 m and a height of 2 m at a position 5 m directly in front of the reference point (reference point or camera position is here defined at 0, 0, 0). Alternatively, if the rendering engine uses a different unit for size, e.g., a virtual unit, the object size metadata may directly specify the virtual size in the virtual unit, and/or the physical size may be converted into the virtual unit after receipt of the object size metadata. In general, it will be appreciated that although the object size metadata of FIGS. 6A and 6B is encoded as XML, any other suitable encoding format may be equally used, e.g., SDP, binary, JSON, MPEG metadata, etc.

It is noted that, in general, the image data may show multiple objects, and the object size metadata may relate to each or a subset of these objects.

It will be further appreciated that the camera metadata and/or object distance may relate to the image data, in that they may be obtained at a same time as the image data is captured. As such, the camera metadata may directly indicate camera parameters which were used during the capture, and the object distance may be the current distance of the object as shown in the image data. Alternatively, the camera metadata and/or object distance may be obtained at a different time but still apply to the situation shown in the image data. For example, in case the camera parameters are static, the camera metadata may be obtained before or after capturing the image data and still apply to the situation shown in the image data. Another example is that it may be assumed that the object distance varies little over time, e.g., by the camera having a relatively fixed position with respect to the object. In another alternative, after having estimated the physical size and/or the virtual size of an object at least once, the rendering device may adapt the rendering of the object based on the variation of the image size in the image data of the physical object. For example, the rendering device may select the object from the image data and scale the virtual object accordingly. This may be used in particular as long as the object remains in view of the camera and the object has fixed dimensions. An advantage is that the object distance may vary without needing updates of the camera metadata. Alternatively, in dynamic situations, the camera metadata and/or object distance may be obtained continuously, e.g., with every image, or periodically (e.g., every 1 sec, 10 sec, 1 minute, $10^{th}$ video frame, $100^{th}$ video frame, etc.) or adaptively (e.g., when image motion is detected or when the camera is adjusted). This may allow coping with, e.g., changes in focal length and thus angle of view, object movement, camera movement, etc. Alternatively, after having received the camera metadata and the related image data at least once, the rendering device may determine the virtual size, and thereafter may adapt the virtual size proportionally to the variation in the image data of the object. This is in particular possible with objects that have fixed or relatively static physical dimensions.

FIG. 7 shows a system 200 for determining of a size of a virtual object in a virtual environment in accordance with its physical size. The system 200 may be, but does not need to be, integrated in a single device, such as but not limited to a smartphone, personal computer, laptop, tablet device, set-top box, smart watch, smart glasses, television, monitor, projector, media player, media recorder, audio system, gaming console, etc. Alternatively, the system 200 may be distributed over multiple devices or subsystems. The system 200 is shown to be connected to a camera 20 from which image data 22 may be received of a user 10. Alternatively, the system 200 may comprise the camera 20. Alternatively, the system 200 may be integrated into the camera 20.

FIG. 7 further shows the system 200 of FIG. 1, which is here shown to provide the image data 22 of the user 10 obtained from the camera 20 to a server 80. The server 80 may then further transmit the image data 22 to other devices participating in the virtual environment, such as rendering devices 300-306. In addition to providing the image data 22 to the server 80, the system 200 may further provide the object size metadata 400, 402 to the server 80 as described with reference to FIGS. 6A and 6B to enable the server 80 and/or the rendering devices 300-306 to establish a size of a virtual representation of the user 10 in the virtual environment in accordance with his/her physical size. For that purpose, different types of object size metadata 400, 402 may be provided depending on whether the system 200 determines the physical size of the user, or whether the server 80 and/or the rendering devices 300-306 determine the physical size of the user. Both types of object size metadata were previously explained with reference to FIGS. 6A and 6B. In the former case (of the system 200), the object size metadata 402 may directly define the physical size of the user, or alternatively directly define the size of the virtual object (see FIG. 6B example). In the latter case (of the server/rendering devices), the object size metadata 400 may comprise camera metadata and the object distance to enable the server 80 and/or the rendering devices 300-306 to calculate the physical size of the user 10 based on the object size metadata 400 (see FIG. 6A example).

FIG. 7 further shows an optional aspect of the system 200, in that the system 200 is shown to communicate with a database 50 via database communication 52. The database 50 may comprise camera metadata of one or more different camera types, which may be stored and retrieved based on their type identifiers. Accordingly, the system 200 may obtain the camera metadata, or additional camera metadata of the camera 20, by obtaining a type identifier of the camera 20, and looking up the type identifier of the camera in the database 50. It will be appreciated that the database 50 may be an internal database but also an external database, e.g., a network-hosted database. Alternatively to using a database, the camera metadata may also be queried from another entity or service, such as a search engine or an 'artificial intelligence'-based assistant service. For that purpose, use may be made of appropriate APIs.

FIG. 7 further shows the system 200, the server 80 and the rendering devices 300-306 to be located at different locations, such as different rooms, buildings or places, as indicated by the dashed lines in FIG. 7. As such, the communication between the devices may be telecommunication, e.g., involving data communication via a network such as, or including, one or more access networks and/or the Internet.

FIG. 8 shows a detailed view of the system 200 of FIG. 7. The system 200 is shown to comprise a camera interface 210 to a camera for obtaining image data 22 of the object, a memory 230 comprising instruction data representing a set of instructions, and a processor 220 configured to communicate with the camera interface 210 and the memory 230 and to execute the set of instructions, wherein the set of instructions, when executed by the processor, cause the processor 220 to obtain camera metadata indicative of an angle of view of the camera, estimate an object distance between the object and the camera, generate object size metadata on the basis of the camera metadata and the object distance to enable a rendering device or server to establish the size of the virtual object in the virtual environment in accordance with a physical size of the object in physical space on the basis of the object size metadata.

The system 200 may use the object size metadata internally. For example, if the system 200 is (part of) a rendering device configured to render the virtual environment, the system 200 may use the object size metadata to determine the size of the virtual object in the virtual environment based on the object size metadata.

Alternatively, the system 200 may output the object size metadata. For that purpose, the system 200 may comprise a network interface 240, e.g., to provide the object size metadata 400, 402 to a network entity. This may enable the network entity to establish the size of the virtual object in the virtual environment in accordance with the physical size of the object on the basis of the object size metadata. In addition, the image data 22 may be provided to the network entity via the network interface 240. The network interface may take any suitable form, including but not limited to a wireless network interface, e.g., based on Wi-Fi, Bluetooth, ZigBee, 4G mobile communication or 5G mobile communication, or a wired network interface based on Ethernet or optical fiber. The network interface 240 may be to a local area network (LAN) network interface but also a network interface to a wide area network (WAN), e.g., the Internet.

The network entity to which the camera metadata is provided may be a server configured to host the virtual environment or a rendering device configured to render the virtual environment. This may be similar to current setups for video conferencing, where either a video-multipoint-control-unit is used to mix the videos of all participants in a particular way (i.e. server-based), or peer-to-peer communication is used between all users and where each user's device renders all input locally (e.g., rendering-device based). FIG. 9 shows a detailed view of such a network entity 300, which may comprise a network interface 310 to a network for receiving image data 22 of an object from a camera, and object size metadata 400, 402 indicative of a size of a virtual object in the virtual environment. The network entity 300 may further comprise a memory 330 comprising instruction data representing a set of instructions. The network entity 300 may further comprise a processor 320 configured to communicate with the network interface 310 and the memory 330 and to execute the set of instructions, wherein the set of instructions, when executed by the processor 320, may cause the processor 320 to generate the virtual object in the virtual environment to comprise a visual rendering of the image data of the object, and to establish the size of the virtual object in the virtual environment in accordance with the object size metadata. The latter may differ depending on the type of object size metadata. For example, if the object size metadata 402 directly defines the physical size of the object, or alternatively directly defines the size of the virtual object, perhaps few if any further calculations are needed. Alternatively, the object size metadata 400 may comprise camera metadata and the object distance. In this case, the processor 320 may first calculate the physical size of the user 10 based on the object size metadata 400, and then determine the size of the virtual object accordingly.

In general, the system 200 of FIG. 8 and the network entity 300 of FIG. 9 may each be embodied as, or in, a device or apparatus. The device or apparatus may comprise one or more (micro)processors which execute appropriate software. The processors of the system and the communication device may be embodied by one or more of these (micro)processors. Software implementing the functionality of the system or the network entity may have been downloaded and/or stored in a corresponding memory or memories, e.g., in volatile memory such as RAM or in non-volatile memory such as Flash. Alternatively, the processors of the system or the network entity may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of the system or the network entity may be implemented in the form of a circuit. It is noted that the system or the network entity may also be implemented in a distributed manner, e.g., involving different devices or apparatuses.

In general, the rendered virtual environment may be displayed using a display. The display may be of a head mounted VR device or in short VR headset, e.g., of a same or similar type as the 'Oculus Rift', 'HTC Vive' or 'PlayStation VR'. Other examples of VR devices are so-termed Augmented Reality (AR) devices, such as the Microsoft HoloLens or the Google Glass goggles, or mobile VR devices such as the Samsung Gear VR or Google Cardboard. It will be appreciated that the display may not need to be head mountable, but rather, e.g., a separate holographic display.

Figure 10:
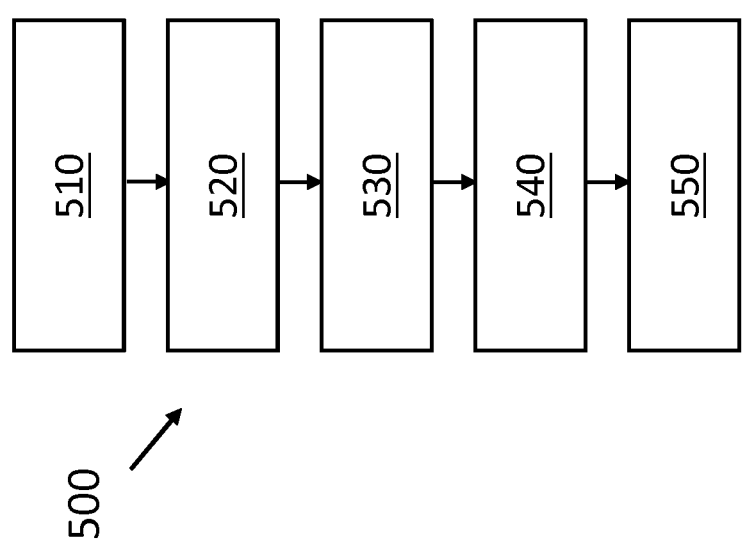
FIG. 10 shows a method for determining of a size of a virtual object in a virtual environment in accordance with its physical size.

FIG. 10 shows a method 500 for determining a size of a virtual object in a virtual environment. The method 500 may comprise, in an operation titled "OBTAINING IMAGE DATA OF OBJECT", obtaining 510 image data of the object from a camera. The method 500 may further comprise, in an operation titled "OBTAINING CAMERA METADATA", obtaining 520 camera metadata indicative of an angle of view of the camera. The method 500 may further comprise, in an operation titled "ESTIMATING OBJECT DISTANCE", estimating 530 an object distance between the object and the camera. The method 500 may further comprise, in an operation titled "ESTIMATING PHYSICAL SIZE OF OBJECT", estimating 540 a physical size of the object in physical space by i) determining an image size of the object in the image data, and ii) determining a relation between the image size and the physical size of the object on the basis of the camera metadata and the object distance. The method 500 may further comprise, in an operation titled "DETERMINING SIZE OF VIRTUAL OBJECT", determining 550 the size of the virtual object for rendering in the virtual environment in accordance with the physical size of the object.

Figure 11:
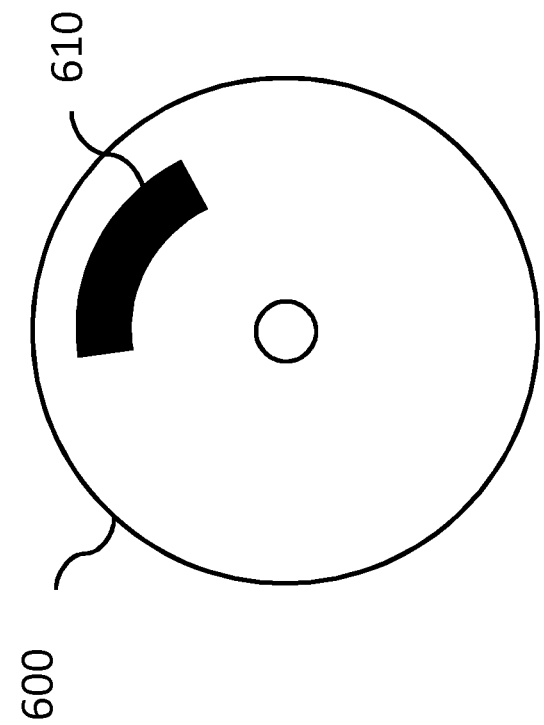
FIG. 11 shows a transitory or non-transitory computer-readable medium which may comprise computer program comprising instructions for a processor system to perform the method, or comprising object size metadata.

The method 500 may be implemented on a computer as a computer implemented method, as dedicated hardware, or as a combination of both. As also illustrated in FIG. 11, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 11 shows, by way of example, an optical disc 600.

With continued reference to FIG. 11, the computer readable medium 600 may alternatively or additionally comprise transitory or non-transitory data 610 representing the object size metadata as described in this specification.

In general, the image data of the object may be post-processed after recording but before transmission to the network entity, e.g., by the camera, the system, etc. In case the object being recorded is a user wearing a head mounted device, such post-processing may include the reconstruction of at least part of the face of the user in the image data, which may be hidden or obfuscated by the head mounted display worn by the user. For that purpose, techniques known per se in the art of video processing may be used, e.g., as described in the paper 'Real-time expression-sensitive HMD face reconstruction' by Burgos-Artizzu et al, Siggraph Asia 2015.

Figure 12:
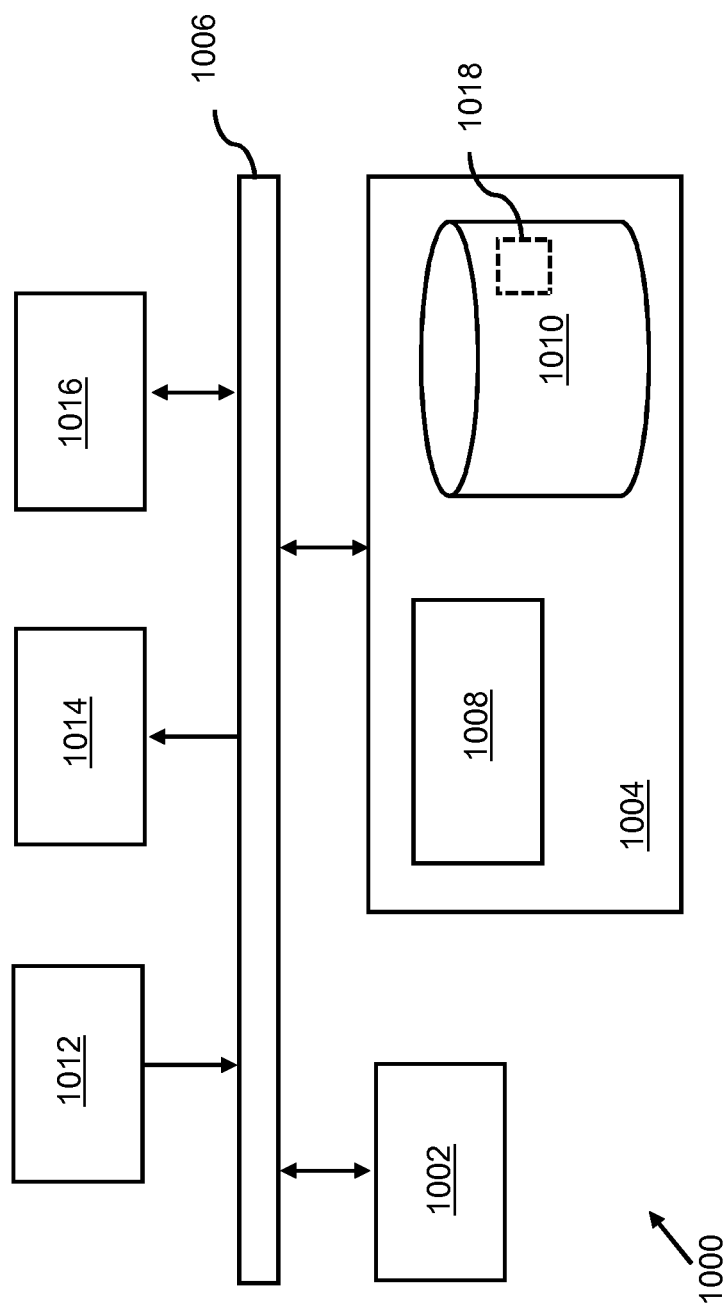
FIG. 12 shows an exemplary data processing system.

FIG. 12 is a block diagram illustrating an exemplary data processing system that may be used in the embodiments of this disclosure. Such data processing systems include data processing entities described in this disclosure, including but not limited to the system and the network entity, e.g., the server and/or the rendering device.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 12, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent a system for determining a size of a virtual object. In that case, application 1018 may represent an application that, when executed, configures data processing system 1000 to perform the various functions described herein with reference to 'system for determining a size of a virtual object'. In another aspect, data processing system 1000 may represent a network entity such as a server or a rendering device. In that case, application 1018 may represent an application that, when executed, configures data processing system 1000 to perform the various functions described herein with reference to 'network entity' or specifically to 'server' or 'rendering device'.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for generating object size metadata associated with a virtual object in a virtual environment, the virtual object representing an object in physical space, comprising:
    obtaining image data of the object from a camera;
    obtaining camera metadata indicative of an angle of view of the camera;
    estimating an object distance between the object and the camera;
    estimating a physical size of the object in physical space by:
        i) determining an image size of the object in the image data, and
        ii) determining a relation between the image size and the physical size of the object on the basis of the camera metadata and the object distance;
    determining the size of the virtual object for rendering in the virtual environment in accordance with the physical size of the object; and
        generating object size metadata comprising the size of the virtual object in the virtual environment to enable a rendering device or server to establish the size of the virtual object in the virtual environment in accordance with a physical size of the object in physical space on the basis of the object size metadata.

2. The method according to claim 1, wherein the virtual object in the virtual environment comprises a visual rendering of the image data of the object.

3. The method according to claim 1, wherein the obtaining the camera metadata comprises obtaining EXIF metadata, MPEG metadata or ONVIF metadata included in or associated with the image data.

4. The method according to claim 1, wherein the obtaining the camera metadata comprises:
    accessing a database comprising camera metadata of different camera types;
    obtaining a type identifier of the camera; and
    retrieving at least part of the camera metadata on the basis of looking up the type identifier of the camera in the database.

5. The method according to claim 1, wherein the determining the object distance comprises obtaining auxiliary data which is indicative of the object distance, and wherein estimating the object distance between the object and the camera comprises analyzing the auxiliary data.

6. The method according to claim 5, wherein the auxiliary data comprises at least one of:

camera metadata indicative of a focal distance of the camera;
depth data obtained from a depth sensor connected to the camera;
further image data obtained from a further camera, wherein the image data and the further image data together represent stereoscopic image data of the object, and wherein estimating the object distance between the object and the camera comprises analyzing the stereoscopic image data; and
directional audio data obtained from a microphone array connected to or comprised in the camera.

7. The method according to claim 1, wherein the virtual environment is a networked virtual environment, wherein the camera is connected to a system which is connected to a network, and wherein the method further comprises:
    providing the image data from the system via the network to a network entity participating in the networked virtual environment, the network entity being a server hosting the virtual environment or a rendering device; and
    providing the object size metadata from the system to the network entity to enable the network entity to establish the size of the virtual object in the virtual environment in accordance with a physical size of the object in physical space on the basis of the object size metadata.

8. The method according to claim 7, wherein the method is performed by the system, wherein the providing the object size metadata comprises:
    providing, as the object size metadata, the size of the virtual object in the virtual environment as determined by the system.

9. The method according to claim 7, wherein the providing the object size metadata comprises providing the camera metadata and the object distance to the network entity to enable the network entity to:
    estimate the physical size of the object in physical space on the basis of the camera metadata and the object distance; and
    determine the size of the virtual object in the virtual environment in accordance with the physical size of the object.

10. A system configured to generate object size metadata associated with a virtual object in a virtual environment, the virtual object representing an object in physical space, the system comprising:
    a camera interface to a camera for obtaining image data of the object;
    a memory comprising instruction data representing a set of instructions;
    a processor configured to communicate with the camera interface and the memory and to execute the set of instructions, wherein the set of instructions, when executed by the processor, cause the processor to:
    obtain camera metadata indicative of an angle of view of the camera;
    estimate an object distance between the object and the camera;
    estimate the physical size of the object in physical space by:
        i) determining an image size of the object in the image data, and
        ii) determining a relation between the image size and the physical size of the object on the basis of the camera metadata and the object distance;

determine the size of the virtual object in the virtual environment in accordance with the physical size of the object;

generate object size metadata to comprise the size of the virtual object in the virtual environment as determined by the processor to enable a rendering device or server to establish the size of the virtual object in the virtual environment in accordance with a physical size of the object in physical space on the basis of the object size metadata.

11. The system according to claim 10, wherein the virtual environment is a networked virtual environment, wherein the system further comprises a network interface to a network, wherein the processor is configured to communicate with the network interface, and wherein the set of instructions, when executed by the processor, cause the processor to:

provide the image data via the network interface to a network entity participating in the networked virtual environment, the network entity being a server hosting the virtual environment or a rendering device for rendering the virtual environment; and provide the object size metadata to the network entity to enable the network entity to establish the size of the virtual object in the virtual environment in accordance with the physical size of the object on the basis of the object size metadata.

12. A network entity being a server for hosting a virtual environment or a rendering device for rendering the virtual environment, the virtual environment comprising a virtual object, the virtual object representing an object in physical space, the network entity comprising:

a network interface to a network for receiving:
   image data of the object from a camera;
   object size metadata indicative of a size of a virtual object in the virtual environment, wherein the object size metadata comprises (i) camera metadata indicative of an angle of view of the camera, and (ii) an object distance between the object and the camera;

a memory comprising instruction data representing a set of instructions;

a processor configured to communicate with the network interface and the memory and to execute the set of instructions, wherein the set of instructions, when executed by the processor, cause the processor to:

estimate the physical size of the object in physical space on the basis of the camera metadata and the object distance;

determine the size of the virtual object in the virtual environment in accordance with the physical size of the object;

generate the virtual object in the virtual environment to comprise a visual rendering of the image data of the object;

establish the size of the virtual object in the virtual environment in accordance with the object size metadata.

\* \* \* \* \*